Patented Jan. 13, 1931

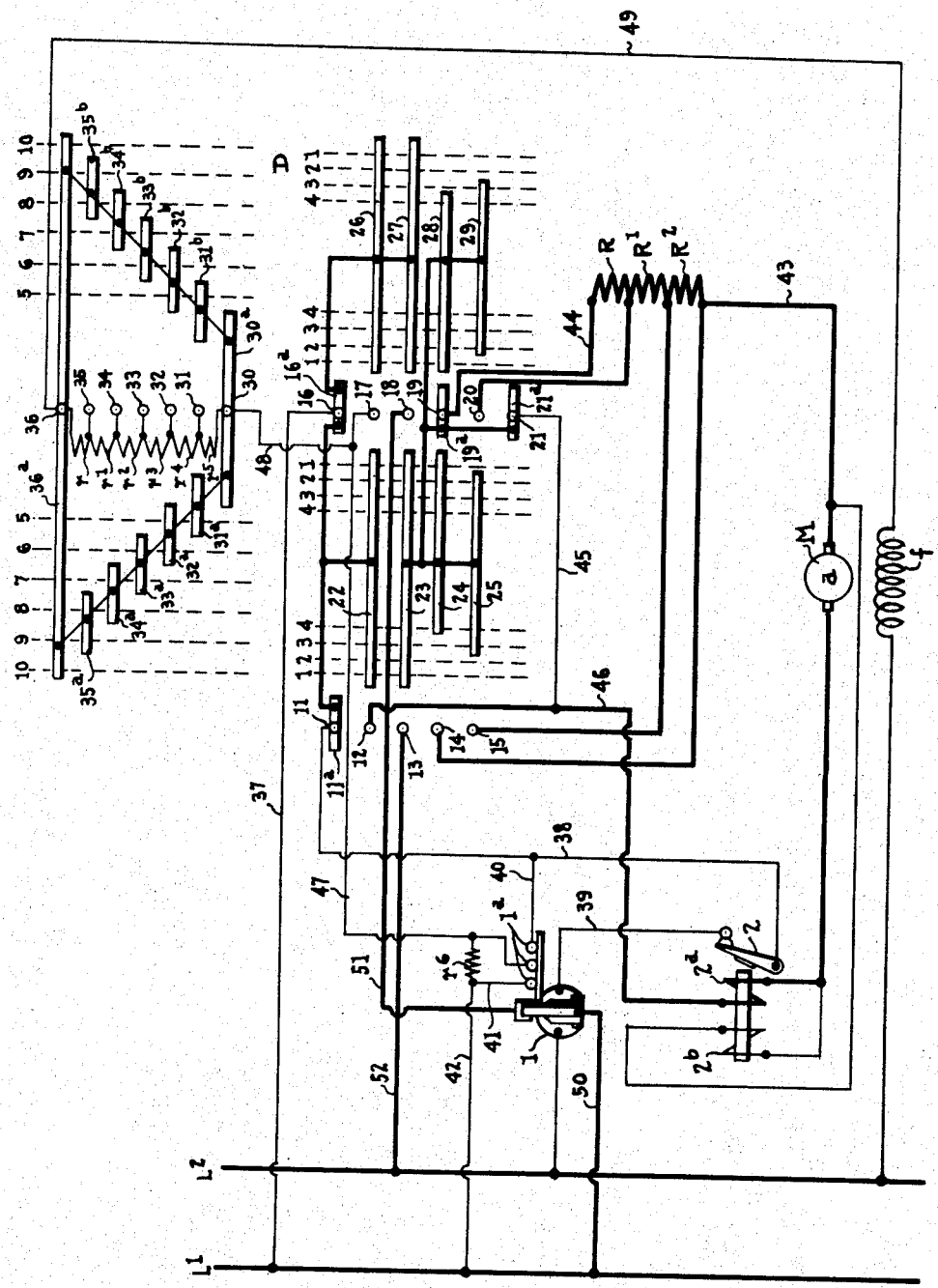

1,789,069

UNITED STATES PATENT OFFICE

EDWIN J. GOVE, OF YOUNGSTOWN, OHIO, ASSIGNOR, BY MESNE ASSIGNMENTS, TO CUTLER-HAMMER INC., OF MILWAUKEE, WISCONSIN, A CORPORATION OF DELAWARE

CONTROLLER FOR ELECTRIC MOTORS

Application filed January 2, 1929. Serial No. 329,742.

This invention relates to improvements in controllers for electric motors.

In the control of adjustable speed motors it is frequently desired to employ a simple drum or the like for controlling the continuity of the motor circuit, for reversal, for speed regulation and for dynamic braking, the operator being relied upon to so effect circuit commutations as to avoid excessive current and voltage conditions. However, so much difficulty has been experienced through careless operation of such controllers that a demand has arisen for one having some effective but yet extremely simple means affording protection against such abnormal conditions as result from too rapid acceleration or too rapid deceleration or plugging.

The present invention has among its objects to provide such a controller, namely one affording the desired protection and yet possessing extreme simplicity.

A further object is to provide such a protective controller requiring only a single relay of simple construction to render the controller responsive to abnormal conditions.

Another object is to provide a controller which provides for disconnection of the motor from its supply upon too rapid acceleration or deceleration and which necessitates return of the controller to off position as a prerequisite to restarting of the motor.

Another object is to provide a controller of the aforesaid character which provides for stopping of the motor by dynamic braking but only in the off position of the controller.

Various other objects and advantages of the invention will hereinafter appear.

The accompanying drawing illustrates diagrammatically one embodiment of the invention which will now be described.

Referring to the drawing, there is illustrated a motor M having an armature $a$ and a shunt field $f$ to be supplied from lines $L^1$, $L^2$ and to be regulated through the medium of armature resistances R, $R^1$, $R^2$ and field resistances $r$, $r^1$, $r^2$, $r^3$, $r^4$ and $r^5$. It is of course to be understood that the motor might have more or less steps of either armature or field resistance.

The controller illustrated comprises a contact drum D, an electroresponsive line switch 1 and an electroresponsive relay 2 in circuit with the operating winding of switch 1. Switch 1 is arranged to be energized by the drum, but only in the off position of the latter, whereas said switch has auxiliary contacts $1^a$ which establish a maintaining circuit for said switch independent of said drum, but including relay 2. Also, as hereinafter set forth, the auxiliary contacts $1^a$ of switch 1 serve to control a step of field resistance $r^5$.

The drum in off position interrupts the motor circuit and establishes a dynamic braking circuit for the motor. Movement of the drum in opposite directions completes the motor circuit for reverse operations of the motor and continued movement of the drum in either direction affords regulation of the armature and field resistances.

The relay 2 is normally closed to maintain switch 1 energized, said relay having windings to render it responsive under abnormal conditions in the motor circuit to deenergize switch 1 and thereby disconnect the motor from its supply. The motor is then uncontrollable by the drum until return of the drum to off position to again energize switch 1. Thus the motor is protected against any prolonged abnormal conditions such as effect response of relay 2, whereas the operator is penalized for his carelessness by having to return the drum to off position in order to restart the motor.

More particularly, the relay 2 has a series winding $2^a$ in series with the motor armature and an opposing shunt winding $2^b$ connected across the motor armature. These windings are so designed that under normal load conditions they permit the relay to remain closed. On the other hand, the series coil has a sufficient number of turns to open the relay against the opposing action of the shunt coil under excessive current conditions in the motor circuit and the shunt coil is designed to open the relay under given voltage conditions with no current in the series coil. (For example, the series coil may be designed to so function at two times the full load current with no voltage on the shunt coil and the shunt coil may be designed to open the relay with double line voltage impressed on it with no current in the series coil.) Thus the relay may be so designed that if the motor is accelerated too rapidly with consequent excessive surges of current the series coil will preponderate the shunt coil and open said relay to deenergize the switch 1, whereas if the motor is decelerated too rapidly, with consequent excessive voltage and reverse current, the shunt winding alone or aided by the series coil when subjected to reverse current will effect opening of the relay to deenergize switch 1. Furthermore, even though too rapid deceleration is avoided, the relay will respond if the operator reverses the motor before stopping thereof. Such reversal will subject the series coil to a high current, while the shunt coil has only a low voltage impressed thereon, with consequent response of the relay to deenergize switch 1. When relay 2 has responded as aforedescribed, it will remain open and if drum D is not returned to off position the motor is permitted to coast until the same is brought to rest while return of the drum to off position stops the motor by dynamic braking. When the motor is brought substantially to rest either by coasting or by dynamic braking relay 2 recloses and the motor can then be restarted, providing the drum has been returned to off position.

Considering the controller in further detail, the drum in off position completes circuit from line $L^1$ by conductor 37 to contact 16 of the drum, thence by cross connected segments $16^a$ and $11^a$ to contact 11 by conductor 38 through relay 2 by conductor 39 through the winding of switch 1 to line $L^2$. This circuit provides for energization of switch 1 and upon response of said switch its contacts $1^a$ connect conductor 38 by conductors 40, 41 and 42 to line $L^1$, thus establishing a maintaining circuit for switch 1 independent of the drum, but inclusive of relay 2.

Also, the drum in off position completes a dynamic braking circuit which may be traced from the right hand terminal of the motor armature by conductor 43 through resistances $R^2$, $R^1$ and R by conductor 44 to drum contact 19, thence by cross connected segments $19^a$ and $21^a$ to contact 21 by conductors 45 and 46 through the coil $2^a$ of relay 2 to the left hand terminal of the motor armature. Furthermore, the drum in off position provides for energization of the motor field, the field being fully excited if switch 1 is in closed position and being weakened by the resistance $r^6$ if said switch is in open position. This energizing circuit may be traced from line $L^1$ by conductor 42 through resistance $r^6$ if switch 1 is open, and through contacts $1^a$ if said switch is closed, by conductors 47 and 48 to contact 30, thence by cross connected contact segments $30^a$ and $36^a$ to contact 36 by conductor 49 through the field $f$ to line $L^2$.

Assuming movement of the drum segments to the left, a circuit for the motor armature may be traced from line $L^1$ by conductor 50 through switch 1, by conductor 51 to contact 18 thence by cross connected contact segments 27, 16 and 22 to contact 12 by conductor 46 to and through winding $2^a$ of relay 2 thence through the motor armature from left to right by conductor 43 through the armature resistance by conductor 44 to contact 19 by cross connected contact segments 28 and 23 to contact 13 and by conductor 52 to line $L^2$.

On the other hand, assuming reverse movement of the drum segments, the motor armature circuit may be traced from line $L^1$ through switch 1 to drum contact 18 as already traced, by cross connected segments 23 and 24 to contact 19 by conductor 44 through the armature resistance and the motor armature in a reverse direction to that previously described through the winding $2^a$ of relay 2 by conductor 46 to drum contact 12 by cross connected segments 26 and 27 to contact 13 and by conductor 52 to line $L^2$.

When the drum is moved in either direction into its successive positions it first excludes armature resistances R, $R^1$ and $R^2$ progressively and then inserts the field resistances $r^5$, $r^4$, $r^3$, $r^2$, $r^1$ and $r$ progressively. When the drum is moved to the left segments 29, 25 and 24 are engaged progressively with contacts 20, 15 and 14. Segment 29 is cross connected with segment 28 and hence when it engages contact 20 it short-circuits resistance R. Segment 25 is cross connected to segment 29 and when it engages contact 15 it short-circuits resistance $R^1$. Segment 24 is cross connected to segment 25 and when it engages contact 14 it short-circuits resistance $R^2$. Upon reverse operation of the drum these same segments short-circuit the armature resistances progressively in the same order. However, these segments accomplish this in the following distinctive manner. Segment 24 first engages contact 19 after which segments 25, 29 and 28 progressively engage contacts 20, 15 and 14.

After the drum has been moved in either direction sufficiently far to exclude the armature resistance it disengages segment $30^a$ from contact 30 thereby inserting resistance $r^5$ in the field circuit, the remaining field resistances being short-circuited by cross connected segments $31^a$ and $36^a$ or $31^b$ and $36^a$ according to the direction of movement of the drum. As will be apparent, the segments $31^a$ to $35^a$ and $31^b$ to $35^b$ are so arranged as to effect inclusion of the resistances $r^4$, $r^3$, $r^2$, $r^1$ and $r$ progressively as the movement of the drum is continued.

What I claim as new and desire to secure by Letters Patent is:

1. The combination with an adjustable speed electric motor, of an armature resistance therefor, a manual controller for controlling said resistance to effect acceleration and deceleration of said motor, and means responsive to abnormal conditions in the motor circuit resulting from improper operation of said controller, to disconnect said motor from its supply and to necessitate predetermined positioning of said controller for restarting, said means having normally opposing control windings, one connected in series with the motor armature and another connected across the motor armature.

2. The combination with an adjustable speed motor, of an armature resistance therefor, a manual controller associated with said resistance operable to effect starting and speed regulation of said motor and adapted in a given position to effect establishment of dynamic braking connections therefor, and means responsive to abnormal conditions in the motor circuit resulting from improper operation of said controller, to disconnect said motor from its supply and to necessitate return of said controller to its braking position as a prerequisite to restarting of said motor, said means having normally opposing control windings, one connected in series with the motor armature and another connected across the motor armature.

3. The combination with an adjustable speed motor having a shunt field winding, of a manual controller operable to effect reversal, acceleration and deceleration of said motor and adapted in a given position to effect dynamic braking thereof, means responsive to abnormal conditions in the motor circuit resulting from improper operation of said controller, to disconnect said motor from its supply and to render said controller ineffective pending return thereof to its braking position, said means having normally opposing control windings, one connected in series with the motor armature and another connected across the motor armature, and means associated with said latter means for weakening the shunt field winding of said motor upon disconnection thereof from its supply.

4. The combination with an adjustable speed electric motor, of a relay having a control winding in series with the motor armature and a control winding connected across the motor armature for modifying the effect of said former winding and a manual controller adapted in a given position to effect dynamic braking of said motor and movable into other positions to effect starting and speed regulation thereof, said relay being responsive to render said controller ineffective in its last mentioned positions and necessitating return of said controller to its dynamic braking position as a prerequisite to restarting of said motor.

5. The combination with an adjustable speed electric motor having a shunt field winding, of a relay having a control winding in a series with the motor armature and a control winding connected across the motor armature for modifying the effect of said former winding, a manual controller adapted in a given position to effect dynamic braking of said motor and movable into other positions to effect starting and speed regulation thereof, said relay being responsive to render said controller ineffective in its last mentioned positions and necessitating return of said controller to its dynamic braking position as a prerequisite to restarting of said motor, and means associated with said relay and acting upon response thereof for weakening the shunt field winding of said motor.

6. The combination with an adjustable speed electric motor, of a manual controller to effect acceleration and deceleration thereof, an electroresponsive switch for disconnecting said motor from its supply, said switch being responsive only upon a predetermined positioning of said controller and being adapted to maintain itself in closed position upon movement of said controller out of said predetermined position, and a relay connected in the energizing circuit of said switch, said relay having normally opposing control windings, one being connected in series with the motor armature, and another being connected across the motor armature.

7. The combination with an adjustable speed motor, of a manual controller operable to effect starting and speed regulation of said motor, and adapted in a given position to effect establishment of dynamic braking connections therefor, an electroresponsive switch for disconnecting said motor from its supply, said switch being responsive only upon movement of said controller into its dynamic braking position and being adapted to maintain itself upon movement of said controller out of such position, and means for controlling said switch to effect opening thereof upon abnormal conditions in the motor circuit resulting from improper operation of said controller, said means having normally opposing control windings, one being connected in series with the motor armature, and another being connected across the motor armature.

8. The combination with an adjustable speed motor having a shunt field winding, of a manual controller operable to effect reversal, acceleration and deceleration of said motor, and adapted in a given position to effect dynamic braking thereof, an electroresponsive switch for disconnecting said motor from its supply upon improper operation of said controller, said switch being adapted to close only upon movement of said controller into its dynamic braking position, and being adapted to maintain itself in other positions of said controller, a relay for interrupting the energizing circuit of said switch, said relay having a control winding connected in series with the motor armature and a modifying control winding connected across the motor armature, and means associated with said switch for weakening the shunt field winding of said motor upon opening of said switch.

In witness whereof, I have hereunto subscribed my name,

EDWIN J. GOVE.